US012579741B2

(12) United States Patent   (10) Patent No.: US 12,579,741 B2
Lev et al.   (45) Date of Patent: Mar. 17, 2026

(54) DETECTING THREE DIMENSIONAL (3D) CHANGES BASED ON MULTI-VIEWPOINT IMAGES

(71) Applicant: NEC Corporation Of America, Herzlia (IL)

(72) Inventors: Tsvi Lev, Tel-Aviv (IL); Yaacov Hoch, Ramat-Gan (IL); Nisim Machluf, Ashkelon (IL); Or Katz, Ganei Tikva (IL); Naomi Sara Kirshner, Tel Aviv (IL)

(73) Assignee: NEC Corporation Of America, Herzilia (IL)

( * ) Notice: Subject to any disclaimer, the term of this patent is extended or adjusted under 35 U.S.C. 154(b) by 148 days.

(21) Appl. No.: 18/422,070

(22) Filed: Jan. 25, 2024

(65) Prior Publication Data

US 2025/0245916 A1    Jul. 31, 2025

(51) Int. Cl.
| | |
|---|---|
| *G06T 17/00* | (2006.01) |
| *G06T 7/33* | (2017.01) |
| *G06V 10/10* | (2022.01) |
| *G06V 10/74* | (2022.01) |
| *G06V 20/17* | (2022.01) |

(52) U.S. Cl.
CPC ................ *G06T 17/00* (2013.01); *G06T 7/33* (2017.01); *G06V 10/16* (2022.01); *G06V 10/761* (2022.01); *G06V 20/17* (2022.01)

(58) Field of Classification Search
CPC .. G06T 17/00; G06T 7/33; G06T 3/14; G06T 7/00; G06T 2207/10016; G06T 2207/10028; G06T 2207/10032; G06T 2207/10048; G06T 2207/20081; G06T 2207/20084; G06T 2207/20221; G06T 2207/20224; G06T 2207/30184; G06T 2207/30196; G06V 10/16; G06V 10/761; G06V 20/17
See application file for complete search history.

(56) References Cited

U.S. PATENT DOCUMENTS

| 11,806,882 | B1 * | 11/2023 | Edwards | ................ | B25J 9/1697 |
| 2020/0082168 | A1 * | 3/2020 | Fathi | ........................ | G06T 7/521 |
(Continued)

FOREIGN PATENT DOCUMENTS

| CN | 102473296 | A | * | 5/2012 | ............... | G06T 5/50 |
| CN | 102201115 | B | * | 12/2013 | |
(Continued)

*Primary Examiner* — Maurice L. McDowell, Jr.

(57) ABSTRACT

A method of detecting three dimensional (3D) changes in sites, comprising receiving a plurality of images of a site captured from a plurality of viewpoints by image sensor(s) mounted on dynamic vehicle(s) scanning the site, registering at least some of the images to each other, creating one or more merged representations of at least part of the site based on the at least some registered images, comparing between the merged representation(s) and one or more corresponding previous merged representations created based on a plurality of previous images captured during one or more previous scans of the site, detecting, based on the comparison, one or more 3D changes indicative of a depth change exceeding a certain threshold in one or more 3D features at the site, and generating a change indication indicative of the one or more detected 3D changes.

17 Claims, 14 Drawing Sheets

(56) References Cited

U.S. PATENT DOCUMENTS

| | | | |
|---|---|---|---|
| 2020/0082611 A1 * | 3/2020 | Haramaty | G06T 17/05 |
| 2022/0292278 A1 * | 9/2022 | Roberts | G06T 7/40 |
| 2024/0111502 A1 * | 4/2024 | Good | G06F 3/04842 |

FOREIGN PATENT DOCUMENTS

| | | | | | |
|---|---|---|---|---|---|
| CN | 105516654 A | * | 4/2016 | | G06T 13/271 |
| ES | 2675171 T3 | * | 7/2018 | | H04N 13/271 |
| KR | 20130033951 A | * | 4/2013 | | G06T 3/4053 |
| KR | 20140085964 A | * | 7/2014 | | H04N 23/60 |
| KR | 102587445 B1 | * | 10/2023 | | G06T 17/00 |

* cited by examiner

400

402

406                  404

408

EXCLUDED REGION

800

802

804

820

830

822

830

824

832A

832B

860

862

864

DETECTING THREE DIMENSIONAL (3D) CHANGES BASED ON MULTI-VIEWPOINT IMAGES

BACKGROUND

The present invention, in some embodiments thereof, relates to detecting 3D changes in sites, and, more specifically, but not exclusively, to detecting 3D changes in sites based on imagery data of the sites captured from multiple viewpoints.

Detecting changes in sites is widely common and employed to serve a plurality of applications. For example, defense, security, safety and/or public order preservation may rely on detecting vehicles, people, objects, and/or the like within and/or outside a perimeter. In another example, agriculture applications may monitor changes in growing areas (e.g., fields, orchards, vineyards, fish ponds, etc.) and take actions accordingly. In another example, material stacks, goods, and/or the like may be monitored, for example, in manufacturing and/or distribution facilities to track changes in quantity, stock, and/or the like.

Automatically detecting such changes in sites may be typically done by analyzing imagery data (e.g., images, video, etc.) of the receptive site captured over time during a plurality of scans to identify accordingly changes in features in the respective site between different scans.

SUMMARY

According to a first aspect of the present invention there is provided a method of detecting three dimensional (3D) changes in sites, comprising using one or more processors for:

Receiving a plurality of images of a site captured from a plurality of viewpoints by one or more image sensors mounted on one or more dynamic vehicles scanning the site.

Registering at least some of the plurality of images to each other.

Creating one or more merged representations of at least part of the site based on the at least some registered images depicting the at least part of the site from at least some of the plurality of viewpoints.

Comparing between the one or more merged representations and one or more corresponding previous merged representations created based on a plurality of previous images captured during one or more previous scans of the site.

Detecting, based on the comparison, one or more 3D changes indicative of a depth change exceeding a certain threshold in one or more 3D features at the site.

Generating a change indication indicative of the one or more detected 3D changes.

According to a first aspect of the present invention there is provided a system for detecting three dimensional (3D) changes in sites, comprising one or more processors configured to execute a code. The code comprising:

Code instructors to receive a plurality of images of a site captured from a plurality of viewpoints by one or more image sensors mounted on one or more dynamic vehicles scanning the site.

Code instructors to register at least some of the plurality of images to each other.

Code instructors to create one or more merged representations of at least part of the site based on the registered at least some images depicting the at least part of the site from at least some of the plurality of viewpoints.

Code instructors to compare between the one or more merged representations and one or more corresponding previous merged representations created based on a plurality of previous images captured during one or more previous scans of the site.

Code instructors to detect, based on the comparison, one or more 3D changes indicative of a depth change exceeding a certain threshold in one or more 3D features at the site.

Code instructors to generate a change indication indicative of the one or more detected 3D changes.

In a further implementation form of the first, and/or second aspects, the at least some images are registered each other according to one or more common visual features detected in the at least some images.

In a further implementation form of the first, and/or second aspects, one or more of the merged representations are created based on pixel subtraction of corresponding pixels in the at least some registered images.

In a further implementation form of the first, and/or second aspects, one or more of the merged representations are created based on at least partial 3D reconstruction of the at least part of the site using the at least some registered images.

In a further implementation form of the first, and/or second aspects, one or more of the merged representations comprise a point cloud model of the at least part of the site.

In a further implementation form of the first, and/or second aspects, one or more of the merged representations comprise a textured 3D model of the at least part of the site.

In a further implementation form of the first, and/or second aspects, one or more of the merged representations comprise an ortophoto of the at least part of the site.

In a further implementation form of the first, and/or second aspects, one or more of the merged representations comprise one or more panoramic images of the at least part of the site created by stitching at least some of the plurality of images.

In a further implementation form of the first, and/or second aspects, the one or more corresponding previous merged representations are selected according to geolocation metadata associated with each of a plurality of previous merged representations of the site. The geolocation metadata is indicative of the geolocation of the at least part of the site depicted in the plurality of previous images used to create the respective previous merged representation.

In a further implementation form of the first, and/or second aspects, the one or more merged representations are registered to the corresponding previous merged representations according to one or more common visual features detected in the one or more merged representations and in the corresponding previous merged representations.

In an optional implementation form of the first, and/or second aspects, one or more reconstruction error detection algorithms are applied to determine whether one or more of the detected 3D changes are induced by one or more reconstruction errors in the one or more merged representations and/or in the one or more corresponding previous merged representations.

In a further implementation form of the first, and/or second aspects, the one or more 3D changes are detected using one or more trained machine learning models.

In a further implementation form of the first, and/or second aspects, the one or more 3D changes are detected using one or more image processing algorithms.

In an optional implementation form of the first, and/or second aspects, one or more 2D changes are first detected which are indicative of one or more potential 3D changes in the at least part of the site by:

Comparing between one or more of the plurality of images depicting the at least part of the site and one or more corresponding previous images of the plurality of previous images.

Detecting one or more 2D changes based on the comparison.

Comparing between at least section of the one or more merged representations and the one or more corresponding previous merged representations in which the one or more 2D change are detected.

Determining whether the one or more 2D changes are 3D changes indicative of a depth change exceeding a certain threshold in one or more 3D features at the site.

In an optional implementation form of the first, and/or second aspects, one or more dynamic vehicles are instructed to conduct one or more additional scans of at least part of the site responsive to detecting one or more suspected 3D changes, and comparing between one or more additional merged representations created based on at least some registered images of a plurality of images captured from a plurality of viewpoints during the one or more additional scans and the one or more corresponding previous merged representations.

In a further implementation form of the first, and/or second aspects, a path followed of the one or more dynamic vehicles to scan the site is similar to a path followed during the one or more previous scans.

In a further implementation form of the first, and/or second aspects, the one or more dynamic vehicles are aerial vehicles which are members of a group consisting of: a drone, an unmanned aerial vehicle (UAV), and/or a satellite.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
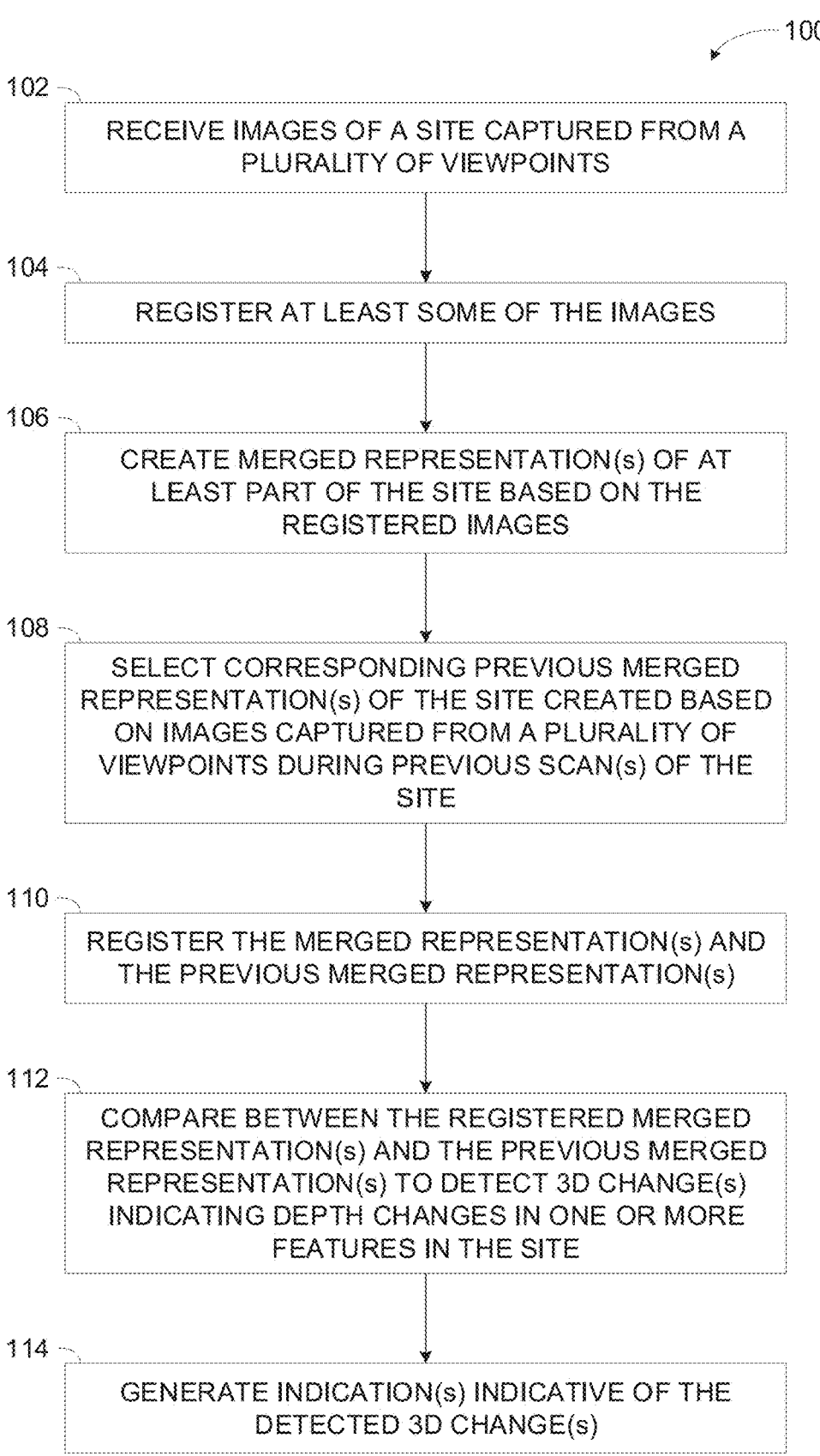
FIG. 1 is a flowchart of an exemplary process of detecting 3D changes in sites, according to some embodiments of the present invention.

The present invention, in some embodiments thereof, relates to detecting 3D changes in sites, and, more specifically, but not exclusively, to detecting 3D changes in sites based on imagery data of the sites captured from multiple viewpoints.

According to some embodiments of the present invention, there are provided methods, systems and computer program products for detecting 3D changes in sites based on comparison between current images of the respective site captured during a current (or most recent) scan and previous images of the site, i.e., images captured Suring one or more previous scans in the past.

In particular, 3D changes in a site may be detected by capturing a plurality of images of the site from a plurality of viewpoints, for example, a view angle, a location, an elevation, an orientation, and/or the like.

The images may be captured by one or more dynamic vehicles, for example, a drone an Unmanned Aerial Vehicle (UAV), a satellite, and/or the like each equipped with one or more image sensors, for example, a camera, a video camera, an Infrared sensor, a thermal sensor, a LiDAR, and/or the like. The dynamic vehicles may be configured, programmed, operated, and/or instructed to scan the site and/or part thereof such that their image sensor(s) may capture the site and/or part thereof from a plurality of viewpoints.

The images captured from the plurality of viewpoints during a (current) scan of the site may be registered to each other such that they may share a common reference, for example, a common coordinate system.

One or more (current) merged representations of the site and/or part thereof may be created using the plurality of registered images captured from a plurality of viewpoints during the current (or most recent) scan of the site. The merged representations, for example, an image, an orthophoto, a panoramic image, a 3D textured model, a point cloud model, and/or the like may be created using one or more methods, techniques, and/or algorithms, for example, projection, image subtractions (difference), 3D construction (partial and/or full), and/or the like.

Since the site and/or part thereof is seen (depicted) in each merged representation from a plurality of different viewpoints, 3D features in the site may become apparent in the merged representation due to the different view angle from which each such 3D feature is seen in of the plurality of images constituting the merged representation.

The current merged representation(s) may be thus analyzed, for example, using image processing, Machine Learning (ML), and/or the like and compared to one or more previous merged representations created using a plurality of (previous) images captured during one or more previous scans of the site to identify 3D changes in one or more 3D features, specifically 3D changes indicative of depth change in the 3D feature(s) which exceed a certain threshold.

Optionally, the dynamic vehicle(s) may be configured, programmed, operated, and/or instructed to scan the site according to one or more common and/or predefined paths, and/or routes such that the images captured in a plurality of different scans may be captured from substantially the same viewpoints.

one or more images captured during the current scan of the site may be first compared to one or more previous images captured during the previous scan(s) to first detect one or more two dimensional (2D) changes which may be indicative of one or more potential 3D changes followed by creating merged representations of only limited Regions of Interest (ROI), for example, areas, regions, and/or sections of the site, where the 2D changes were detected, and comparing these reduced size merged representations to detect the potential 3D changes.

Optionally, one or more images captured during the current scan of the site may be first compared to one or more previous images captured during the previous scan(s) to first detect one or more two dimensional (2D) changes which may be indicative of one or more potential 3D changes followed by creating merged representations of limited areas, regions, and/or sections of the site, where the 2D changes were detected, and comparing these reduced size merged representations to detect the potential 3D changes.

Optionally, in case one or more suspected 3D changes could not be conclusively and/or deterministically detected das changes, one or more of the dynamic vehicles may be operated, and/or instructed to conduct one or more additional scans of the site and/or part thereof in order to capture additional images of the site. One or more merged representations created using the additional images may be then compared to one or more previous merged representations in attempt to more accurately, robustly, and/or reliably determine whether the suspected 3D changes are indeed changes indicative of a depth difference exceeding the threshold or not.

Automatically detecting 3D changes in a site based on merged representations of the site depicting the site from a plurality of different viewpoints may present major benefits and advantages compared to existing change detection methods and system.

First, detecting 3D changes based on analysis of 2D image as may be done by the existing methods may be highly limited due to a number of drawbacks. First, it may be very difficult and frequently even impossible to detect 3D changes in 2D images showing the site from above since 3D features may not be apparent, discernable, and/or noticeable in top down 2D view. In addition, 3D changes may not be easily distinguished from 2D changes in top down images.

These limitation are effectively overcome by comparing between merged representations of the site rather than between 2D images since the merged representations may show the site from a plurality of viewpoints thus making 3D features highly apparent and distinguishable from their background and/or other features. As the 3D features are well seen and detected in the merged representations, comparing between the current merged representation(s) and the previous merged representation(s) may significantly increase performance of 3D change detection, for example, accuracy, reliability, integrity, robustness, and/or the like. Performance of the merged representations based 3D change detection may be even better for sites which are substantially flat, for example, a ground surface, a road, a yard, a floor, a roof, and/or the like.

Some of the existing change detection systems may employ 3D reconstruction to create a model of the scanned site. However, 3D reconstruction is a highly resource intensive task since in order to create a sufficiently elaborate model of the site for effective change detection, the reconstruction should rely on a very large number of images depicting the site from a plurality of different viewpoints typically with high overlap and/or redundancy. Such image processing and modeling may consume major computing resources, for example, processing resources, storage resources, network resources, computing time (reduced latency), and/or the like.

Detecting changes based on the merged representations of the site may eliminate or at least significantly reduce the need for 3D reconstruction of the site thus significantly reducing computing resources and/or processing time, thus making it significantly faster and more robust. In addition, the merged representations, the current and previous, may be created using a significantly reduced number of images compared to the 3D reconstruction thus further increasing its speed and robustness due to the reduced image capturing and/or processing.

In addition, compared to 3D reconstruction based change detection, the merged representations based 3D change detection may be highly immune to false detections of changes to 3D features caused by one or more visual effects, for example, reflections (glass, water, etc.), complex 3D structures (e.g., vegetation, etc.) and/or the like which may be falsely interpreted as changes in 3D features.

Moreover, operating the dynamic vehicle(s) to follow common paths, and/or routes and capturing the images of the site from substantially similar viewpoints in a plurality of different scans of the site may allow for improved comparison between merged representations created using images captured during the different scans thus further increasing the 3D change detection performance.

Furthermore, first identifying 2D changes which is a significantly simpler task done using the readily available images compared to the more complex 3D change detection done by analyzing and comparing the merged representations. First detecting 2D changes which may be indicative of potential 3D changes and creating accordingly only reduced size merged representations of the ROI, i.e., the limited sections of the site where the 2D changes were detected may significantly reduce computing resources, for example, processing power, compute time, storage resources, and/or the like.

In addition, launching one or more additional scans and identifying and/or estimating 3D changes based on comparison between additional merged representation created based in images captured during the additional scan(s) may significantly increase 3D change detection performance.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of detecting 3D changes in sites, according to some embodiments of the present invention.

An exemplary process 100 may be executed to detect one or more 3D changes in one or more sites based on comparison of current images of the respective site compared to previous images of the site, i.e., images captured in the past.

In particular, the 3D changes exceeding a certain depth threshold may be detected by merging a plurality of images of the site captured from a plurality of viewpoints during one or more scans of the site to create one or more merged representation of the site and comparing the merged representation(s) to one or more merged representation created by merging a plurality of images of the site captured from a plurality of viewpoints during one or more previous scans.

Since they are captured from a plurality of different viewpoints, 3D features in the site may become apparent in the merged representations due to the difference in view angle and thus comparing between the merged representation(s) and previous merged representation(s) may reveal changes in such 3D features, i.e., 3D changes indicative of depth change exceeding a certain threshold.

Figure 2:
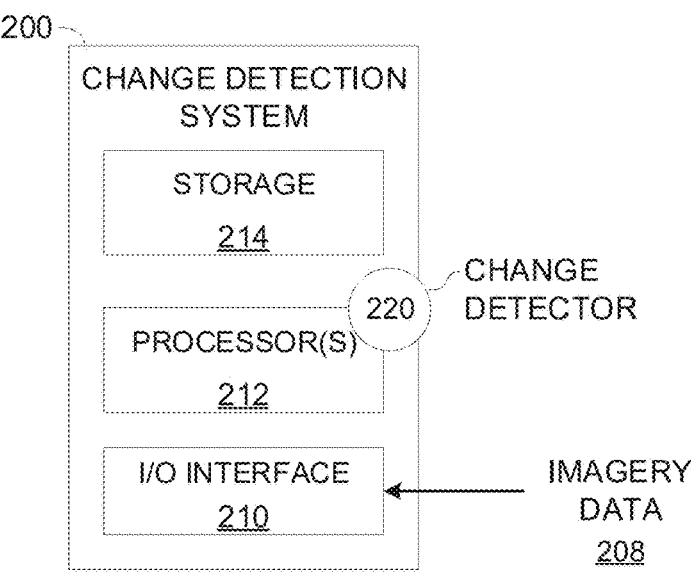
FIG. 2 is a schematic illustration of an exemplary system for detecting 3D changes in sites, according to some embodiments of the present invention.
Figure 2:
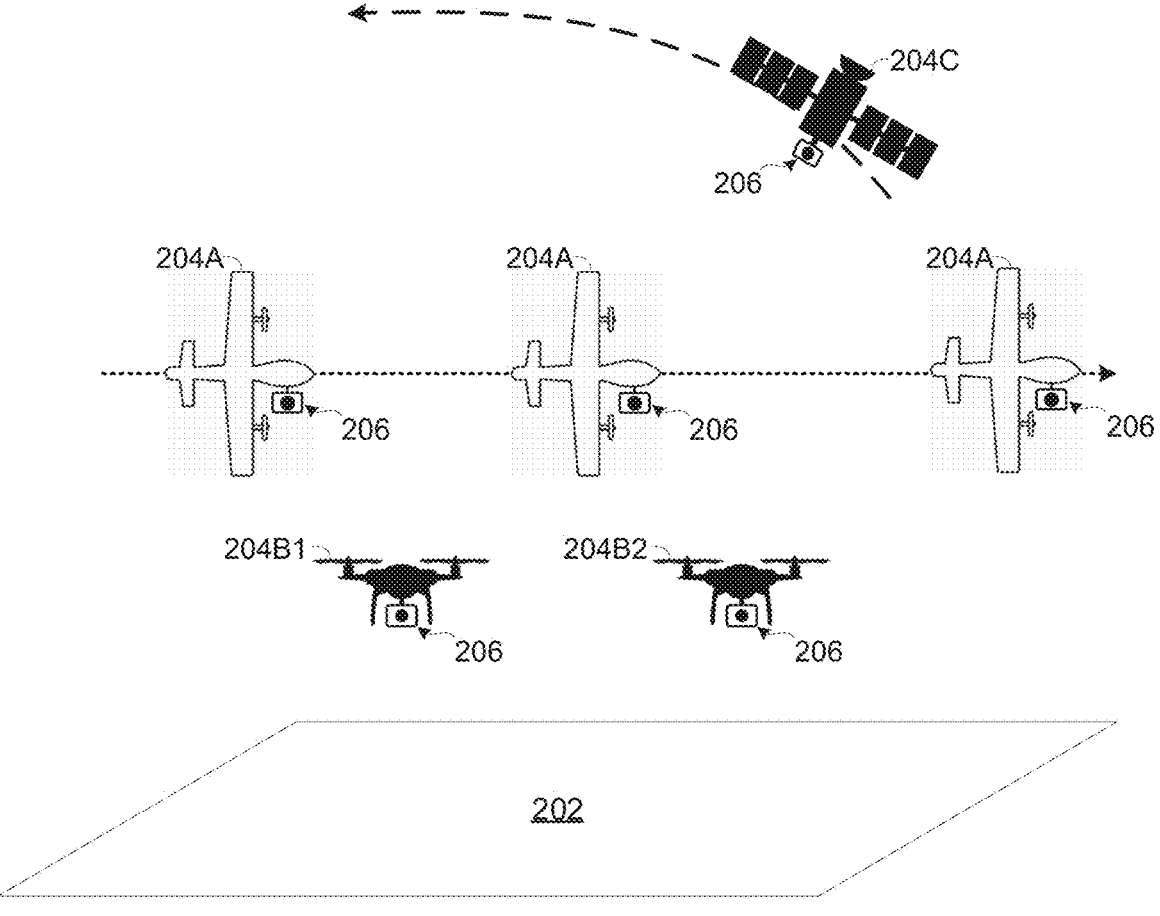

Reference is also made to FIG. 2, which is a schematic illustration of an exemplary system for detecting 3D changes in sites, according to some embodiments of the present invention.

An exemplary change detection system 200 may be deployed and adapted to detect 3D changes in one or more sites 202 which may include practically any site, for example, an urban area, a rural area, a military, governmental, civilian, and/or commercial site, area and/or facility (e.g., factory, logistic center, military base, country border line area, commercial mall, parking lot, civil institute, etc.), and/or the like.

For brevity, a single 202 is described herein after. This however should not be construed as limiting since the operation of the change detection system 200 may be easily expanded, duplicated and/or scaled for a plurality of sites such as the site 202.

In particular, the change detection system 200 may detect 3D changes in the site 202 based on imagery data comprising a plurality of images depicting the site 202 from a plurality of different viewpoints, i.e., a plurality of view angles.

The plurality of images may be captured using one or more image sensors 206 deployed to capture images of the site 202 from a plurality of viewpoints. Typically, the image sensors 206 may be mechanically coupled, for example, mounted, carried, and/or integrated to one or more dynamic vehicles 204 operated, and/or adapted to scan the site 202.

The dynamic vehicles 204 may include one or more aerial vehicles, for example, an Unmanned Aerial Vehicle 204A, a drone 204B, a satellite 204C and/or the like each equipped with one or more image sensors 206, for example, a camera, a video camera, a thermal imaging camera, an Infrared sensor, a depth camera, a Laser Detection and Ranging (LiDAR) sensor, and/or the like.

One or more methodologies, procedures and/or sequences may be applied for capturing the images of the site 202 from a plurality of different viewpoints, i.e., from a plurality of different positions with respect to the site 202. Each viewpoint and/or position may be expressed with respect to the site 202 by one or more positioning parameters, for example, an angle, a location, an orientation, an altitude, and/or the like.

For example, the images of the site 202 may be captured by a plurality of image sensors 206 mounted on a plurality of dynamic vehicles 204 located, stationary and/or dynamically, at different positions and thus capturing the site from a plurality of different viewpoints. In another example, the images of the site 202 may be captured by one or more image sensors 206 mounted on one or more dynamic vehicles 204 which move over the site 202 and scan the site 202 such that the images captured by the image sensor(s) 206 mounted on the moving dynamic vehicle(s) 204 may depict the site 202 from a plurality of different viewpoints.

Moreover, one or more of the dynamic vehicles 204 may be adapted to take, and/or follow a common path (route) during their scans of the site 202 such that the images captured by the image sensors(s) 206 during at least some of the scans may be captured from substantially the same viewpoints, optionally from the same viewpoints. For example, one or more UAVs 204A, drones 204B, and/or satellites 204C operated to scan the site 202 in a plurality of scans may be configured, programmed, and/or instructed to follow the same path and/or route during at least some of the plurality of scans.

The change detection system 200, for example, a server, a computing node, a cluster of computing nodes and/or the like may include an Input/Output (I/O) interface 210, a processor(s) 212, and a storage 214 for storing data and/or code (program store).

The I/O interface 210 may comprise, for example, one or more wired and/or wireless interfaces, ports, and/or links, implemented in hardware, software, and/or combination thereof, for connecting to one or more wired and/or wireless networks, for example, a Local Area Network (LAN), a Wireless LAN (WLAN, e.g., Wi-Fi), a Wide Area Network (WAN), a Municipal Area Network (MAN), a cellular network, the internet, and/or the like.

In another example, the I/O interface 210 may further include one or more wired and/or wireless I/O interfaces, ports and/or interconnections, for example, a Universal Serial Bus (USB) port, a serial port, a Bluetooth (BT) interface, a Radio Frequency (RF) interface, Wireless Local Area Network (WLAN), and/or the like.

Via the I/O interface 210, the change detection system 200 may receive imagery data 208 relating to the site 202 comprising a plurality of images captured by the image sensor(s) 206 mounted on the vehicle(s) 204 during one or more scans of the site 202, in particular a plurality of images depicting the site 202 and/or part thereof from a plurality of different viewpoints. For example, via the I/O interface 210, the change detection system 200 may communicate over one or more networks with one or more of the vehicles 204, and/or one or more remote network resources, for example, a system, a service, a storage, and/or the like to receive the imagery data 208. In another example, the change detection system 200 may retrieve imagery data 208 stored in one or more external media storage devices attached and/or connected to one or more ports and/or interconnects of the I/O interface 210.

The processor(s) 212, homogenous or heterogeneous, may include one or more processing nodes arranged for parallel processing, as clusters and/or as one or more multi core processor(s).

The storage 214 may include one or more non-transitory memory devices, for example, persistent devices such as, for example, a ROM, a Flash array, a hard drive, a Solid State Disk (SSD), and/or the like, as well as volatile devices such as, for example, a RAM device, a cache memory and/or the like. The storage 224 may further comprise one or more local and/or remote network storage resources, for example, a storage server, a Network Attached Storage (NAS), a network drive, a cloud storage service and/or the like accessible via the I/O interface 210.

The processor(s) 212 may execute one or more software modules, for example, a process, a script, an application, an agent, a utility, a tool, an Operating System (OS), a service, a plug-in, an add-on, and/or the like each comprising a plurality of program instructions stored in a non-transitory medium (program store) such as the storage 214 and executed by one or more processors such as the processor(s) 212.

Optionally, the processor(s) 212 may further include, utilize and/or apply one or more hardware elements available to the change detection system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator, and/or the like.

The processor(s) 212 may therefore execute one or more functional modules utilized by one or more software modules, one or more of the hardware modules and/or a combination thereof. For example, the processor(s) 212 may execute a change detector (change detection engine) 220 adapted to execute the process 100 for detecting one or more 3D changes in one or more sites 202 and generate one or more indications and/or notifications accordingly in response to detecting 3D changes in the site 202.

Optionally, the change detection system 200, specifically, the change detector 220 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud Platform (GCP), Microsoft Azure, Amazon Web Service (AWS) and Elastic Compute Cloud (EC2), IBM Cloud, and/or the like. The cloud computing service(s) may be adapted to receive the imagery data 208 and/or generate indication(s) in response to detecting 3D changes in the site 202.

As stated herein before for the change detection system 200, while, for brevity the process 100 is described herein for a single site 202, it should not be construed as limiting since, as may become apparent tot a person skilled in the art, the process 100 may be expanded, duplicated and/or scaled for a plurality of sites such as the site 202.

As shown at 102, the process 100 starts with the change detector 220 receiving imagery data 208 comprising imagery data relating to the site 202.

The imagery data 208 may comprise, for example, a plurality of images of a site 202 and/or part thereof captured from a plurality of viewpoints by one or more image sensors 206 mounted on one or more dynamic vehicles 204 scanning the site 202 during a current and/or most recent scan, collectively designated current scan hereinafter.

In particular, the imagery data 208 may include a plurality of images of the site 202 captured in a plurality of scans of the site 202, specifically images of the site 202 captured from a plurality of viewpoints during the current scan of the site 202 and images of the site 202 captured from a plurality of viewpoints during one or more previous scans.

The change detector 220 may receive the imagery data 208 from one or more sources according to one or more operations modes. For example, in a real-time operation mode the change detection system 200 may be adapted to detect 3D changes in the site 202 in real-time. In such deployments, the change detection system 200 may communicate with one or more devices, apparatuses, systems, and/or services to receive the imagery data 208 in real-time, i.e., during the current scan of the site 202 by the vehicle(s) 204 and/or immediately after the current scan. In another operation mode, for example, an offline operation mode, the change detection system 200 may be adapted to detect 3D changes in the site 202 offline, i.e., not in-real-time during the current scan of the site 202.

For example, to support real-time operation, the change detector 220 may communicate, via one or more networks and/or communications channels, with one or more of the vehicles 204 to receive a plurality of images of the site 202 and/or part thereof captured by the image sensor(s) 206 from a plurality of viewpoints during the current scan of the site 202. The change detector 220 may optionally communicate with one or more image storage systems and/or services to receive a plurality of images of the site 202 and/or part thereof captured from a plurality of viewpoints during one or more previous scans of the site 202.

In another example which may be also applied for real-time operation, the change detector 220 may communicate, via one or more networks, with one or more image distribution systems and/or services adapted to receive the images from the vehicles 204 and distribute the images to one or more other systems, for example, the change detection system 200. The image distribution system(s) may optionally store the plurality of images captured by the image sensor(s) 206 in a plurality of scans of the site 202, current and previous scans. As such, the change detector 220 may receive from such image distribution system(s) both a plurality of images captured during a current scan of the site 202 and a plurality of images captured during one or more previous scans of the site 202.

In another example, typically applicable for offline change detection, imagery data 208 comprising the plurality of images captured during a current scan of the site 202 and the plurality of images captured during one or more previous scans of the site 202 may be stored in one or more storage systems and/or services accessible to the change detection system 200 via one or more networks such that the change detector 220 may retrieve the imagery data 208.

In another offline change detection example, the imagery data 208 comprising the current scan imagery data and previous scan(s) imagery data of the site 202 may be stored in one or more attachable storage media devices (e.g., memory stick). The attachable storage media device(s) may be attached to the I/O interface 210 of the change detection system 200 to make the imagery data 208 available for retrieval by the change detector 220.

As shown at 104, the change detector 220 may register at least some of the images captured from the plurality of different viewpoints during the current scan of the site 202 such that the images are registered to a common reference, for example, a common coordinate system.

The change detector 220 may apply one or more registration methods, techniques and/or algorithms for registering the images. For example, the change detector 220 may register the images according to one or more common features, specifically common visual features of the site 202 which are detected in each of the images, specifically static features which are may not dynamically change and/or move over time. Such static features may include, for example, features of static structures, features of natural static elements and/or objects, road markings, and/or the like.

To this end, the change detector 220 may analyze the images using one or more image analysis tools, and/or algorithms, for example, image processing, computer vision, classifiers, and/or the like to identify a plurality of visual features at the site 202, specifically static features. These features may appear differently in the images since the images are captured from different viewpoints and the change detector 220 may therefore map and correlate between common visual features identified in multiple images.

The change detector 220 may then register the images according to one or more properties of the common features identified in both images, for example, dimensions, location, positon, orientation, and/or the like. It should be noted that image analysis and registration is known in the art and details of the registration is out of scope of the present disclosure.

Figure 3A:
FIG. 3A and FIG. 3B are images of an exemplary site which are registered to create a merged image of the site for detecting 3D changes in the site, according to some embodiments of the present invention.
Figure 3A:
Figure 3B:

Reference is now made to FIG. 3A and FIG. 3B, which are images of an exemplary site which are registered to create a merged image of the site for detecting 3D changes in the site, according to some embodiments of the present invention.

As seen in FIG. 3A, a first image 300 and a second image 302 depict at least part of an exemplary site such as the site 202, for example, a parking lot from two different viewpoints. This means that the images 300 and 302 are captured by one or more image sensors such as the image sensor 206 positioned at different positions with respect to the parking lot, for example, location, angle, orientation, altitude, and/or the like.

As seen, a car 310 parked in the parking lot is depicted differently in the first image 300 and a second image 302 which are captured from the two different viewpoints.

As seen in FIG. 3B, the first image 300 and the second image 302 may be registered to each other, for example, by a change detector such as the change detector 220 such that two images are registered to a common reference, for example, a common coordinate system. In particular, the change detector 220 may analyze the images 300 and 302 using to identify a plurality of visual features of the parking lot, specifically static features such as, for example, road markings, traffic sign poles, street lamps, and/or the like. The change detector 220 may then register the images 300 and 302 according to one or more properties of the common features identified in the images 300 and 302.

Reference is made once again to FIG. 1.

As shown at 106, the change detector 220 may create one or more merged representations of the site 202 and/or part thereof, also designated current merged representations, based on the at least some registered images captured during the current scan of the site 202 and depicting at least part of the site 202 from at least some of the plurality of viewpoints.

Specifically, the change detector 220 may create one or more merged representations each depicting a certain zone, area, and/or portion of the site 202, collectively designated zone herein after, by merging together a plurality of images of the same zone which are registered to each other and may this depict physical features at the zone from a plurality of viewpoints (angles).

The merged representation of a respective zone in the site 202 may therefore comprise, for example, an image, a model, a map, and/or the like showing the features captured in the registered images from a plurality of different viewpoints.

Since the features at the zone are captured and seen in the registered images from a plurality of different viewpoints, 3D features in the site 202 may become apparent in the merged representation(s) due to the difference in view angle and a 3D.

The one or more of the merged representations of the site 202 and/or part thereof may be created, for example, by the change detector 220, using one or more methods, techniques, and/or algorithms. For example, one or more of the merged representations of the site 202 and/or part thereof may be created based on pixel subtraction of corresponding pixels in at least some registered images depicting the same zone. In particular, the values, for example, RGB values, Luma values, Chroma values, and/or the like of pixels in one (first) image may be subtracted from corresponding values of corresponding pixels in another (second) image after the first and second images are registered to each other.

In another example, the one or more of the merged representations of the site 202 and/or part thereof may be created by projecting one or more of the registered images depicting the same zone one on top the other. The image projection may involve one or more transformations, for example, superposition, disposition, displacement, rotation, isometry, mirroring, and/or the like.

In another example, one or more of the merged representations of the site 202 and/or part thereof may be created based on at least partial 3D reconstruction of at least part of the site 202. Full 3D reconstruction may be done to reconstruct the entire site 202 and/or partial 3D reconstruction may be applied to reconstruct only part of the site 202, for example, one or more zones in the site 202. 3D reconstruction conducted using at least some of the registered images depicting the site 202 from a plurality of different viewpoints is known in the art and is out of scope of the present disclosure.

The merged representation(s) created, for example, by the change detector 220 may further include one or more image types, formats, and/or structures created using the registered images. For example, the merged representation(s) may comprise one or more stitched images, for example, a panoramic image created by stitching a plurality of registered images to depict multiple zones, i.e., a larger part (portion, section, segment) of the site 202. In another example, the merged representation(s) may comprise one or more point cloud models created based on the registered images as known in the art. In another example, the merged representation(s) may comprise one or more ortophotos of the site 202 created based on the registered images as known in the art. In another example, the merged representation(s) may comprise one or more textured 3D models each comprising a 3D computer graphics representation of elevation data to represent terrain or overlaying objects of the site 202 created based on the registered images as known in the art, for example, a Digital Surface Model (DSM), a Digital Elevation Model (DEM), and/or the like.

Figure 4A:
FIG. 4A and FIG. 4B are merged images of an exemplary site created for detecting 3D changes in an exemplary site based geolocation data, according to some embodiments of the present invention.
Figure 4A:
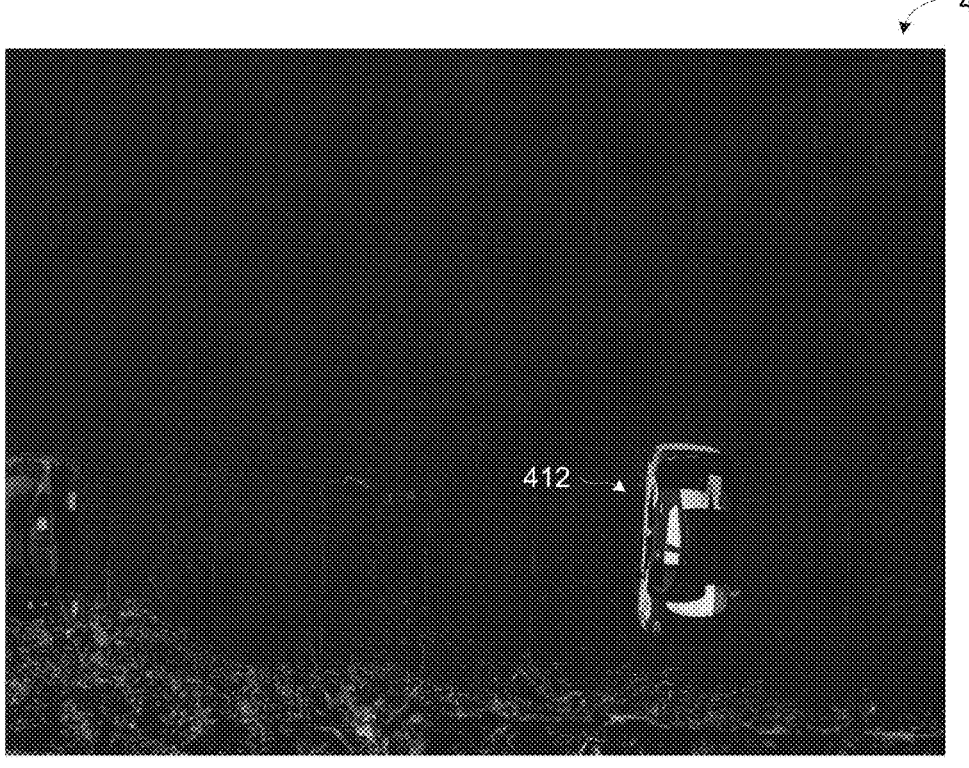
Figure 4B:
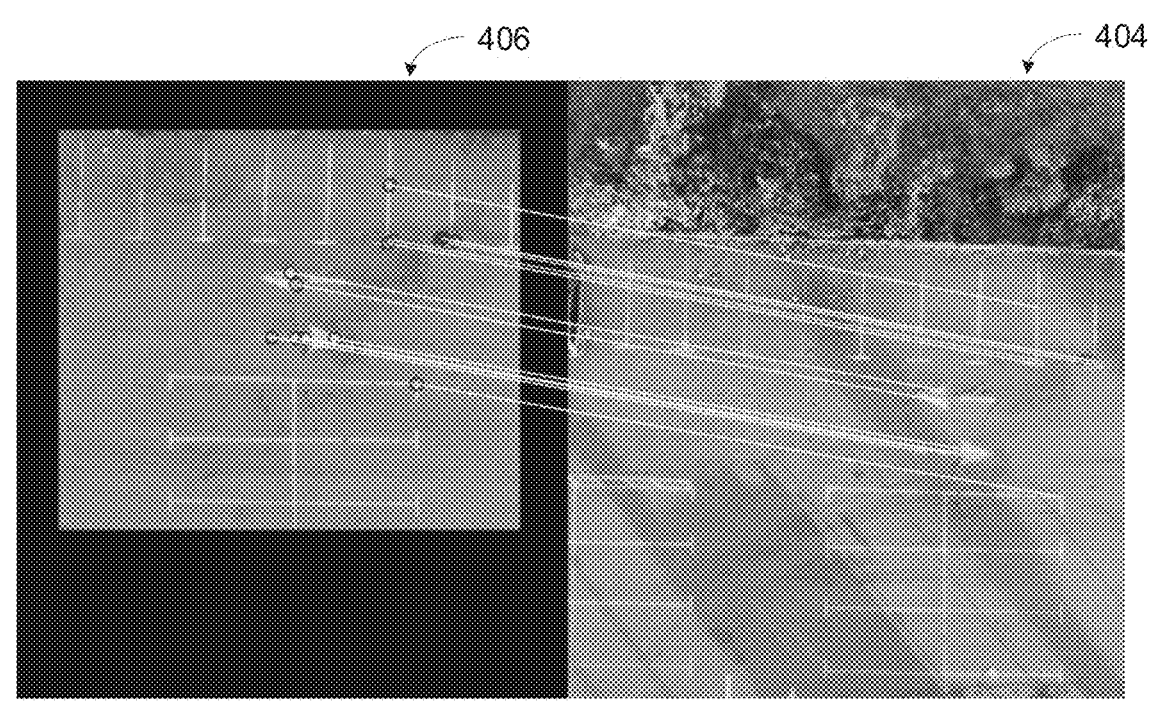
Figure 4B:
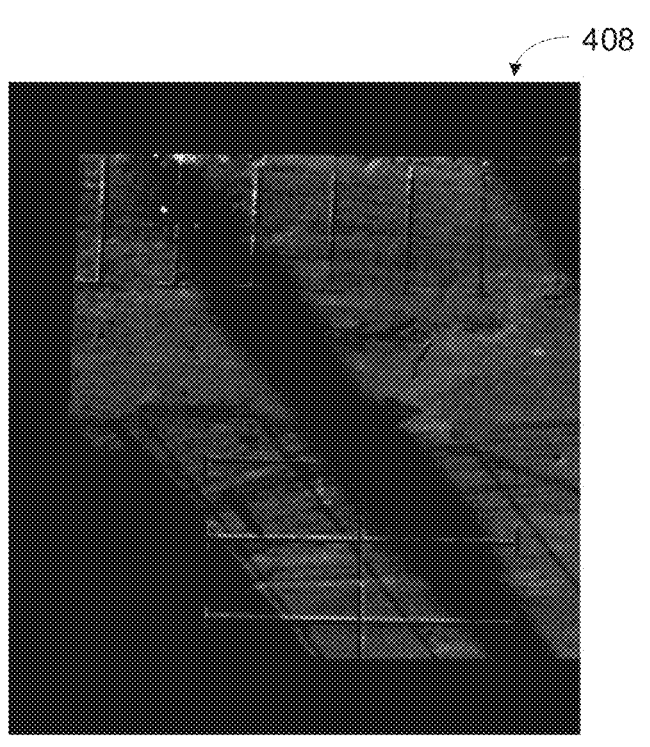

Reference is now made to FIG. 4A and FIG. 4B, which are merged images of an exemplary site created for detecting 3D changes in an exemplary site based geolocation data, according to some embodiments of the present invention.

As seen in FIG. 4A, images 400 and 402 are exemplary merged image created, for example, by a change detector such as the change detector 220, based on a plurality of registered images, for example, two images such as, for example, the first image 300 and the second image 302 depicting a certain zone of an exemplary site such as the site 202 from two different viewpoints.

Image 400 may be created, for example, by projecting the first image 300 and the second image 302 one on top the other. A projected image 410 of a vehicle such as the vehicle 310 combining the appearance (image) of the vehicle 310 as it is seen in the first image 300 and its appearance as seen in the second image 302 may make the vehicle apparent due to the difference in its appearance when captured from the two different viewpoints.

Image 402 may be created, for example, by subtracting pixels in the first image 300 from corresponding pixels in the second image 302. A difference image 412 of a vehicle such as the vehicle 310 created by subtracting corresponding pixels showing the vehicle 310 in the image 300 and in the second image 302 may make the vehicle apparent due to the difference in its appearance when captured from the two different viewpoints.

As seen in FIG. 4B, images 404 and 406 are images depicting a zone (section) of an exemplary site 202, for example, a parking lot may be registered to each other as described herein before in step 104. The registered images 404 and 406 may be merged for example, by the change detector 220 to create a merged representation, for example, a difference image 408 created by subtracting pixels (values) one of the images, for example, the image 404 from corresponding pixels (values) in the second image 406.

As seen the difference image 408 may not show substantial differences between the registered images 404 and 406, specifically no 3D changes since there no 3D features are captured in these images. Moreover, while appearance of shadows on the parking lot surface may change between the images 404 and 406 captured from two different viewpoints, such changes may not become apparent since the shadows are not 3D features but rather 2D features.

Optionally, the change detector 220 may exclude one or more regions, areas, and/or features, collectively designated excluded regions herein, detected on the images and avoid using features detected in the excluded regions and feature therein for creating the merged representation. In particular, the change detector 220 may exclude one or more regions which are not targeted for detecting changes, specifically 3D changes, specifically such regions which may be subject to changes and even frequent changes which are of no interest, for example, an area of vegetation, a water body surface, and/or the like.

Excluding regions in which changes are of no interest may significantly reduce the computing resources required for processing the merged image, for example, processing resources (computing power), compute time, storage resources (e.g. capacity, etc.), and/or the like.

Figure 5:
FIG. 5 is an image of an exemplary site manipulated to exclude irrelevant regions and used for detecting 3D changes in the site, according to some embodiments of the present invention.

Reference is now made to FIG. 5, which is an image of an exemplary site manipulated to exclude irrelevant regions and used for detecting 3D changes in the site, according to some embodiments of the present invention.

An image 500 of an exemplary site such as the site 202, for example, a parking lot may be manipulated, for example, by a change detector such as the change detector 220, to exclude one or more regions from one or more merged representations created for the parking lot and/or part thereof.

For example, one or more regions around the parking lot may include areas of vegetation, which are outside the parking lot that is the targeted area for detecting 3D changes, and while the vegetation may exhibit significant changes, these vegetation areas are not targeted for change detection and may be therefore excluded from the merged representation and/or from the change detection process.

Reference is made once again to FIG. 1.

As shown at 108, the change detector 220 may select one or more previous merged representations of the site 202 and/or part thereof created based on a plurality of previous images captured during one or more previous scans of the site 202, i.e., during one or more times in the past.

The previous merged representation(s) may be created using the plurality of previous images used captured and thus depicting the site 202 and/or part thereof from a plurality of viewpoints as described in step 106 herein before.

This means that one or more of the vehicles 204 may be configured, instructed, and/or operated to scan the site 202 and/or part thereof according to one or more timing rules, for example, continuously, periodically (e.g., once a day, once week, once a month, etc.), on command, and/or a combination thereof.

Moreover, as described herein before, one or more of the dynamic vehicles 204 may be adapted, instructed, and/or operated to follow a common path (route) during their scans of the site 202 such that the images captured by their image sensors(s) 206 during at least some of the scans may be captured from substantially the same viewpoints, optionally from the same viewpoints. As such, the path followed by the vehicle(s) 204 during the current scan may be similar (same) to the path followed by the vehicle(s) 204 during one or more of the previous scans. It should be noted, that the vehicle(s) 204 operated to scan the site 202 during different scans may be the same vehicle(s) 204 or different ones.

The change detector 220 may receive one or more previous merged representations of the site 202 and/or part thereof, for example, as part of the imagery data 208. In another example, the change detector 220 may receive, retrieve and/or fetch one or more of the previous merged representation(s) from one or more external storage resources, for example, a networked storage resource, a cloud storage service, and/or the like. In another example, the change detector 220 may retrieve and/or fetch one or more of the previous merged representation(s) from a local repository stored, for example, in storage 214 of the change detection system 200.

The change detector 220 may apply one or more methods, techniques and/or algorithms for selecting previous merged representation(s) of which may best match and/or best corresponds to the current merged representation(s), i.e., the merged representation(s) created based on the images captured during the current scan of the site 202.

For example, change detector 220 may select one or more previous merged representations corresponding to the current merged representation(s) according to geolocation metadata, for example, Global Positioning System (GPS)

data, geographical coordinates, and/or the like associated with each of a plurality of previous merged representations of the site 202.

The geolocation metadata of each previous merged representation may be indicative of the geolocation of the at least part of the site 202, for example, one or more zones of the site 202 which is depicted in the plurality of previous images used to create the respective previous merged representation. For example, geolocation metadata of a respective previous merged representation may include positioning data of at least part of the site 202 depicted in the respective previous merged representation, for example, geographical coordinates of the borders of the respective previous merged representation, and/or the like. In another example, the site 202 may be segmented to a plurality of zones which may be uniquely identified (ID), for example, numbered, coded, and/or the like. In such case, the geolocation metadata of a respective previous merged representation may include the IDs of the zones depicted in the respective previous merged representation. In another example, the geolocation metadata of a respective previous merged representation may include positioning data of the image sensor(s) 206 which captured the previous images used to create the respective previous merged representation, for example, geographical coordinates, elevation, view angle, and/or the like.

In another example, change detector 220 may select one or more previous merged representations corresponding to the current merged representation(s) based on visual analysis of the previous merged representation(s), specifically a visual analysis with respect to the current merged representation(s). The change detector 220 may use one or more visual analysis tools, for example, computer vision, image processing, classification, and/or the like to identify a one or more common features in depicted in the merged representation(s) and select accordingly one or more previous merged representations which depict the same features depicted in the current merged representation(s).

Figure 6:
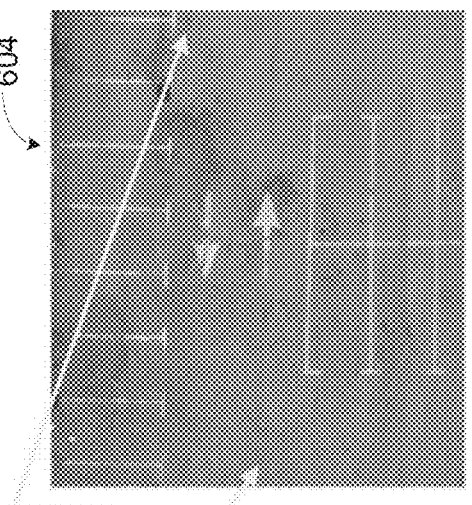
FIG. 6 presents images of a previous merged representation of an exemplary site selected according to geolocation metadata for comparison to a current merged representation registered to detect 3D changes in the site, according to some embodiments of the present invention.
Figure 6:
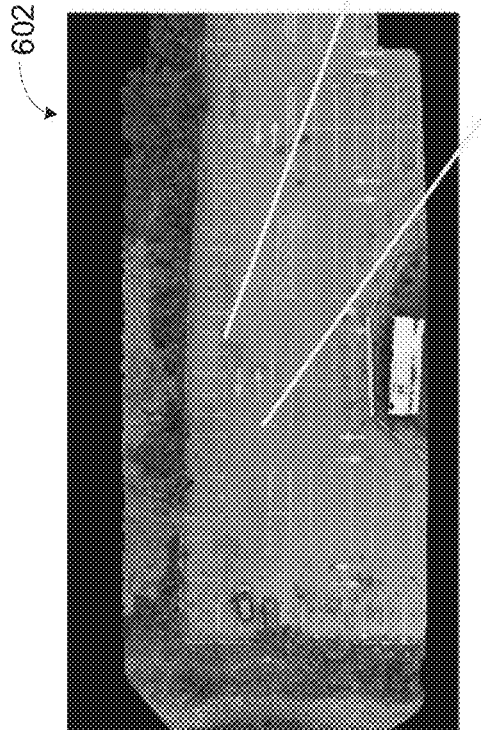
Figure 6:
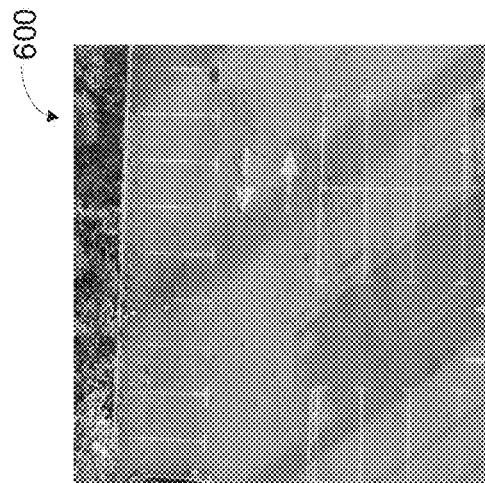

Reference is now made to FIG. 6, which presents images of a previous merged representation of an exemplary site selected according to geolocation metadata for comparison to a current merged representation registered to detect 3D changes in the site, according to some embodiments of the present invention.

A change detector such as the change detector 220 may select a previous merged representation 604 of an exemplary site such as the site 202, for example, a parking lot according to geolocation metadata associated with the merged representation 604. In particular, the change detector 220 may select the previous merged representation 604 from a larger previous merged representation 602, for example, an orthophoto and/or panoramic image showing a larger part (portion) of the parking lot.

The change detector 220 may analyze geolocation data associated with a (current) merged representation 600, for example, GPS data, and/or the like and may select the previous merged representation 604 associated with matching geolocation metadata such that the previous merged representation 604 may accurately correspond to the current merged representation 600.

Reference is made once again to FIG. 1.

As shown at 110, the change detector 220 may register the current merged representation(s) of the site 202 with corresponding previous merged representation(s) of the site 202 and/or part thereof, such that each current merged representation and its corresponding previous merged representation may be registered and referenced to a common coordinate system.

The change detector 220 may register each current merged representation and its corresponding previous merged representation using the same registration methods as described for the plurality of images captured from different viewpoints in step 104 of the process 100, for example, according to one or more common visual features detected in the each (current) merged representation and in its corresponding previous merged representation.

As shown at 112, the change detector 220 may compare between one or more of the (current) merged representations of the site 202 and/or part thereof and one or more corresponding previous merged representations of the site 202 and/or part thereof after the current and previous merged representations are registered to each other.

In particular, the change detector 220 may compare between the current merged representation(s) and the corresponding previous merged representation(s) to detect one or more 3D changes indicative of depth changes exceeding a certain threshold in one or more 3D features at the site 202.

The 3D changes may relate to one or more of a plurality of changes in the site 202, for example, one or more 3D features which were previously detected in the site 202 and are now absent, one or more 3D features which were not previously detected in the site 202 and are now detected, and/or the like. In another example, the 3D changes may include one or more changes in positioning of one or more 3D features detected in the site 202, for example, a location, an orientation, a direction and/or the like. In another example, the 3D changes may include one or more changes in dimensions of one or more 3D features detected in the site 202, for example, a length, a width, a height, a depth, a shape, a layout, a contour, and/or the like.

The certain threshold may be predefined and/or dynamically adjusted according to one or more parameters, attributes, and/or conditions relating to one or more of the 3D features, an application for which the 3D change detection is utilized, environmental conditions, and/or the like. For example, assuming the 3D features are large features, for example, large vehicles such as, for example, a truck, a bus, and/or the like, the certain threshold may be set to a relatively high value such that small changes in location, position, and/or orientation of the large vehicles is not classified as 3D changes. In another example, assuming the 3D features comprise material stacks, for example, building materials, produced goods, lumber, and/or the like which are monitored for stock monitoring, theft detection, and/or the like, the certain threshold may be set to a relatively low value such that small changes in dimensions of the material stacks, for example, height, length, width, and/or the like may be classified as 3D changes.

The change detector 220 may apply one or more methods for comparing between the current and previous merged representations of the site 202 to detect 3D changes between the representations.

For example, according to some embodiments, the change detector 220 may use one or more visual analysis algorithms to compare between the current and previous merged representations of the site 202 to detect 3D changes in these representations. Such visual analysis algorithms may include, for example, computer vision and/or image processing such as, for example, edge detection, feature extraction and detection (e.g., SURF, etc.), image segmentation based detection, object recognition, features classification, and/or the like.

Figure 7:
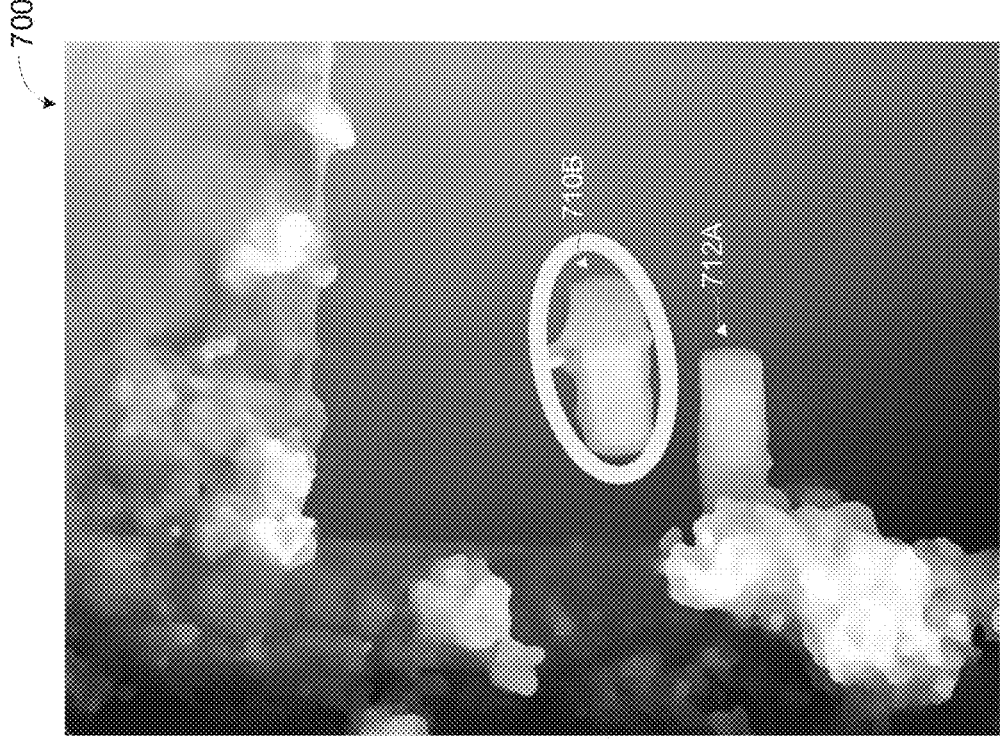
FIG. 7 presents merged representations of an exemplary site in which 3D changes are detected, according to some embodiments of the present invention.
Figure 7:
Figure 7:
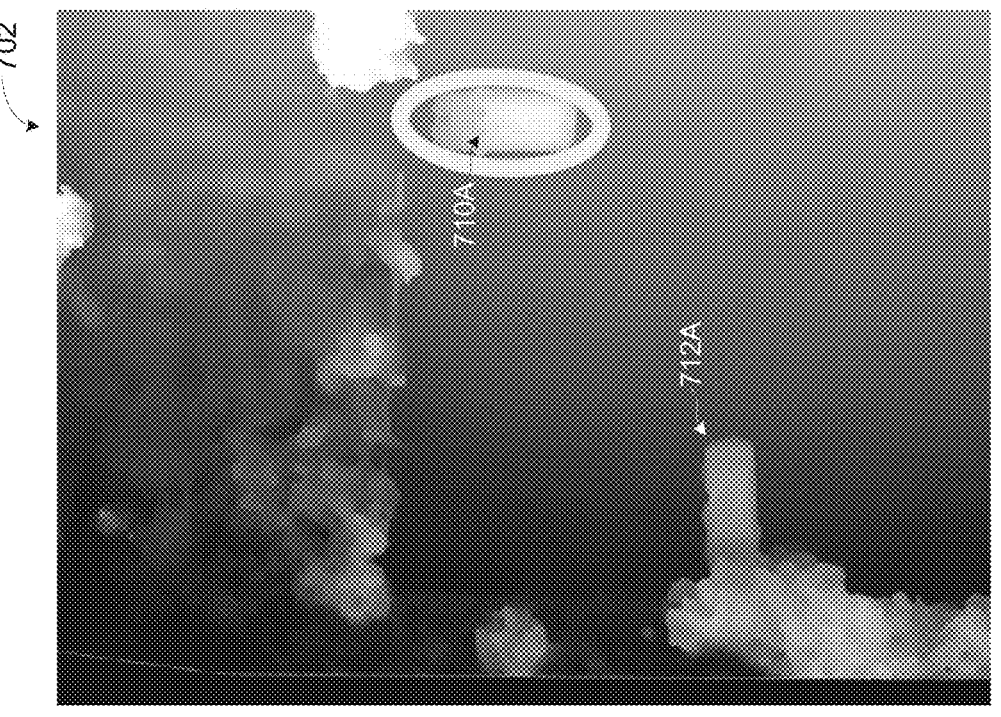

Reference is now made to FIG. 7 which presents merged representations of an exemplary site in which 3D changes are detected, according to some embodiments of the present invention.

A change detector such as the change detector 220 may apply one or more image processing algorithms to visually analyze a current merged representations 700 and a previous merged representations 702 of an exemplary site such as the site 202, for example, a parking lot in which one or more vehicles are parked, stand, and/or move.

As seen, based on the visual analysis and comparison of the current merged representations 700 and the previous merged representations 702, the change detector 220 may detect that a first vehicle 710 has changed its location from a first location A detected in the previous merged representations 702 to a second location B detected in the current merged representations 700. The change detector 220 may therefore classify accordingly the location change as a 3D change in the parking lot site.

The change detector 220 may further detect a second vehicle 712 which has not changed its location A and may therefore determine accordingly that there is no 3D change relating to the second vehicle 712.

According to some embodiments, the change detector 220 may use one or more Machine Learning (ML) models trained to analyze merged representation relating to one or more sites such as the site 202 and detect one or more 3D changes between corresponding merged representations of the respective site 202.

The ML model(s), for example, a neural network, a Deep learning Neural Network (DNN), a classifier, a statistical classifier, a Support Vector Machine (SVM), and/or the like may be trained in one or more supervise, unsupervised, and/or semi-supervised training session using a plurality of training samples comprising a plurality of merged representations created using a plurality of images captured during a plurality of scans of the site 202 from a plurality of different viewpoints.

The ML model(s) may therefore trained with such training samples, the ML model(s) may therefore, adapt, adjust, and/or evolve to detect 3D changes between merged representations created based on images captured during different scans of the site 202, i.e., in particular 3D changes to one or more 3D features where the 3D changes exceed a certain threshold.

The ML model(s) may further trained and/or learned to dynamically adjust the certain threshold according to parameters, attributes, and/or conditions relating to the 3D features detected in the site 202, the application for which the 3D change detection is utilized, environmental conditions, and/or the like. To this end, the ML model(s) may be trained with one or more training datasets comprising, for example, training samples each associating a 3D change with a label indicating whether the respective 3D change is detected or not such that the ML model(s) may adjust, adapt, and/or evolve to learn how to properly apply and/or adjust the certain threshold accordingly according to the 3D changes of the training samples.

Reference is now made to FIG. 8A, FIG. 8B, FIG. 8C and FIG. 8D, which present merged representations of an exemplary site analyzed using machine learning to detect 3D changes in the site, according to some embodiments of the present invention.

Figure 8A:
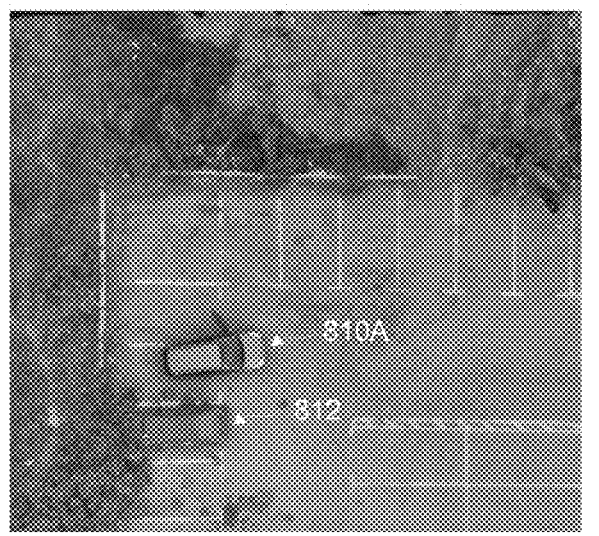
FIG. 8A, FIG. 8B, FIG. 8C and FIG. 8D present merged representations of an exemplary site analyzed using machine learning to detect 3D changes in the site, according to some embodiments of the present invention.
Figure 8A:
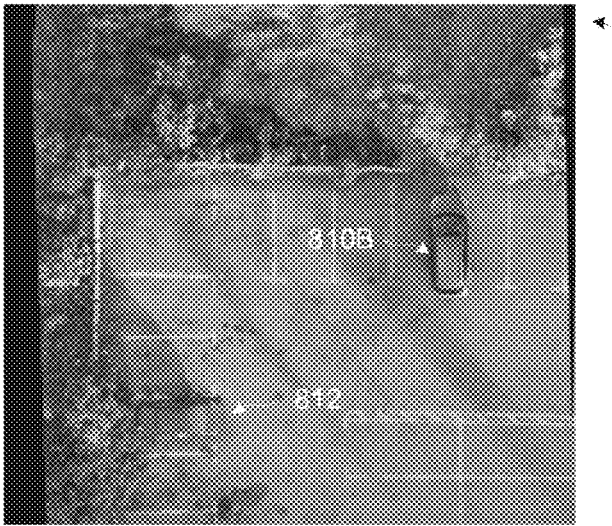
Figure 8A:
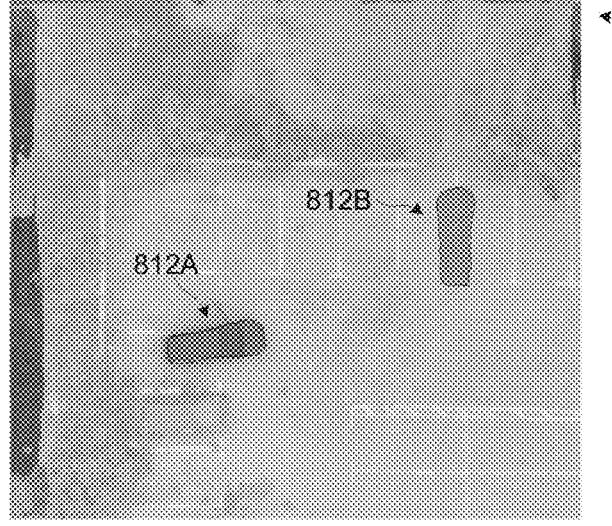

As seen in FIG. 8A, a change detector such as the change detector 220 may apply one or more trained ML models to analyze a current merged representation 800 of an exemplary site such as the site 202, for example, a parking lot. In particular, the or more ML model(s) may analyze the current merged representation 800 compared to a previous merged representation 802 of the parking lot.

As seen, based on the analysis, the ML model(s) may detect a first vehicle 810 and a second vehicle 810 in both the current merged representation 800 and the previous merged representation 802. In particular, the ML model(s) may detect the first vehicle 810 is located at location A (810A) in the current merged representation 800 and at location B (810B) in the previous merged representation 802.

As seen in 804, based on comparison between the current merged representation 800 and the previous merged representation 802, the ML model(s) may detect that the first vehicle 810A changed its location from location B (812B) to location A (812A).

The ML model(s) may further detect that the second vehicle 812 did not change its location between the previous merged representation 802 and the current merged representation 800.

Figure 8B:
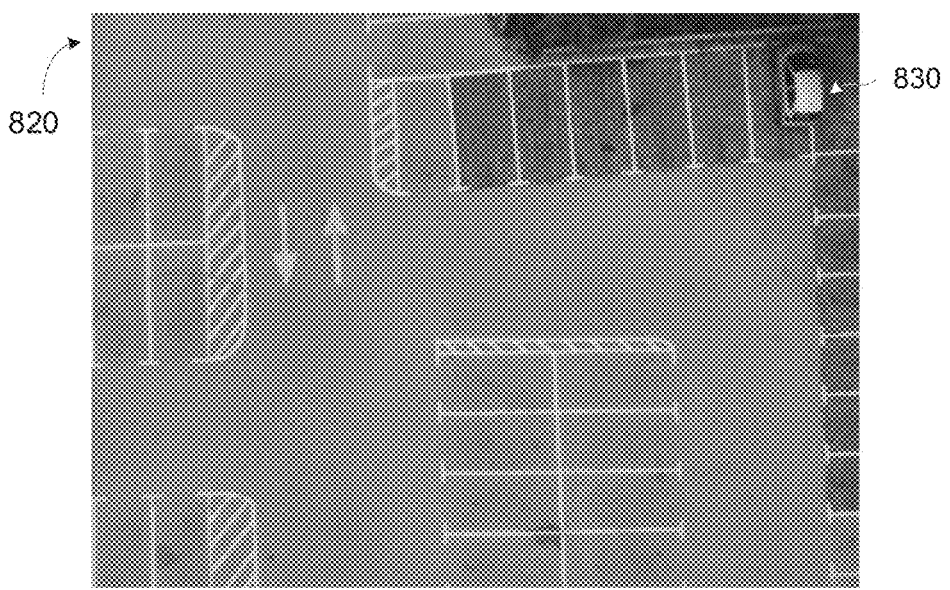
Figure 8B:
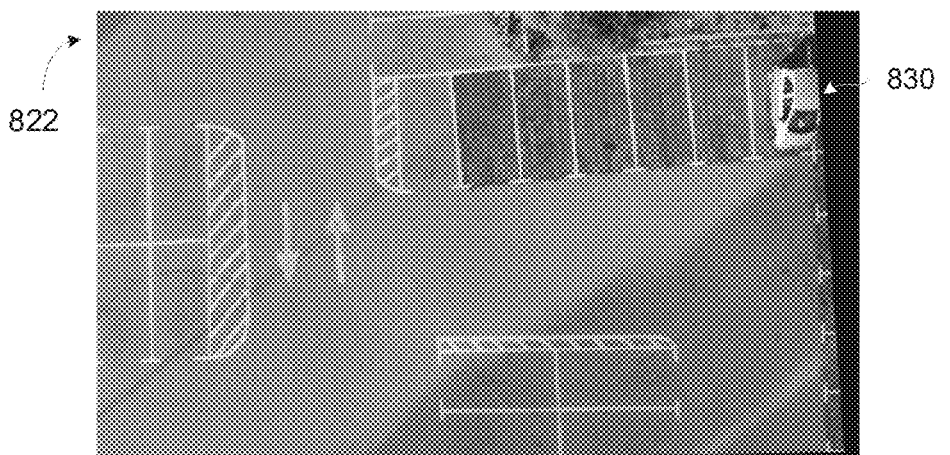
Figure 8B:
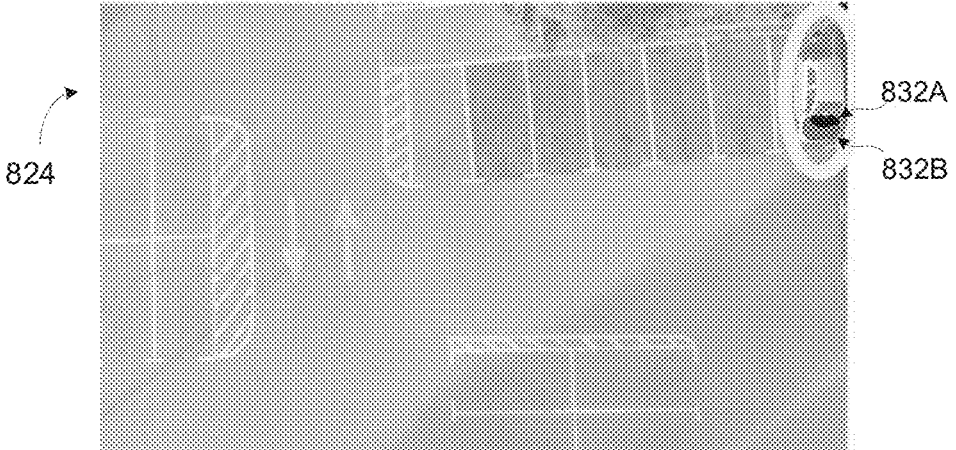

As seen in FIG. 8B, one or more trained ML models may be applied by the change detector 220 to analyze a current merged representation 820 of an exemplary site 202, for example, a parking lot compared to a previous merged representation 822 of the parking lot.

As seen, based on the analysis, the ML model(s) may detect a vehicle 830 in both the current merged representation 800 and the previous merged representation 802. However, as seen in 824, based on comparison between the current merged representation 820 and the previous merged representation 822, the ML model(s) may detect that the vehicle 830 did not substantially changed its location, for example, a distance between the location of the vehicle 830 in the current merged representation 800 and the location of the vehicle 830 in the previous merged representation 802 is less than a certain threshold, for example, one meter.

However, while the ML model(s) may detect, estimate and/or determine that the vehicle 830 did not substantially changed its location, the vehicle 830 did change its (parking) direction. In particular, the trained ML model(s) analyzing the current merged representation 820 and the previous merged representation 822 may identify 3D features of the vehicle 830 indicative of its orientation, and direction, for example, an front engine hood 832B identified facing down in the previous merged representation 822 compared to a rear trunk cover 832A identified facing down in the current merged representation 820.

Figure 8C:
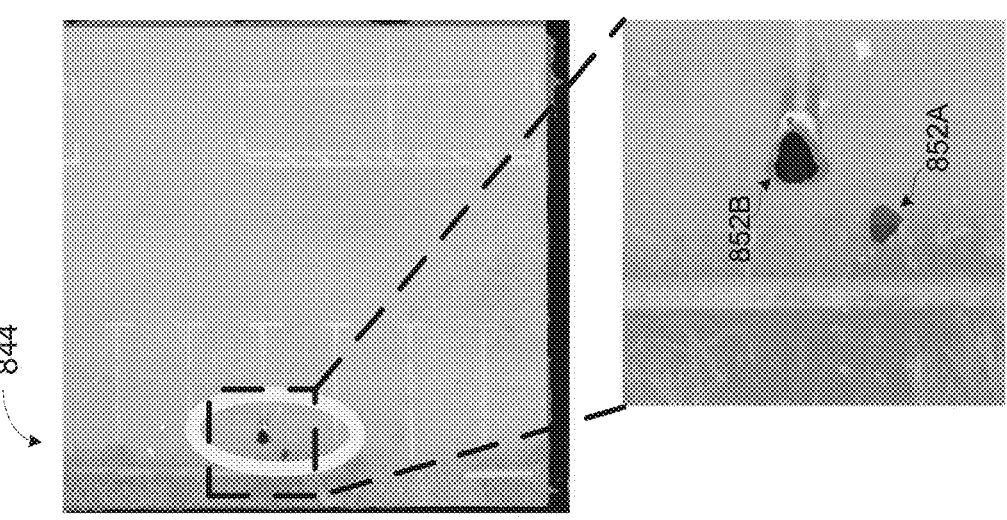
Figure 8C:
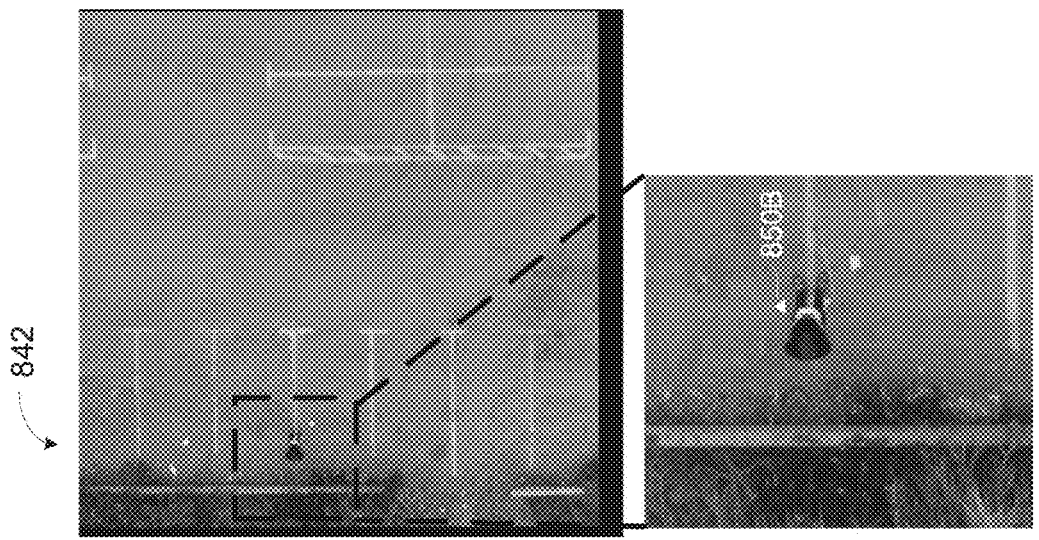
Figure 8C:
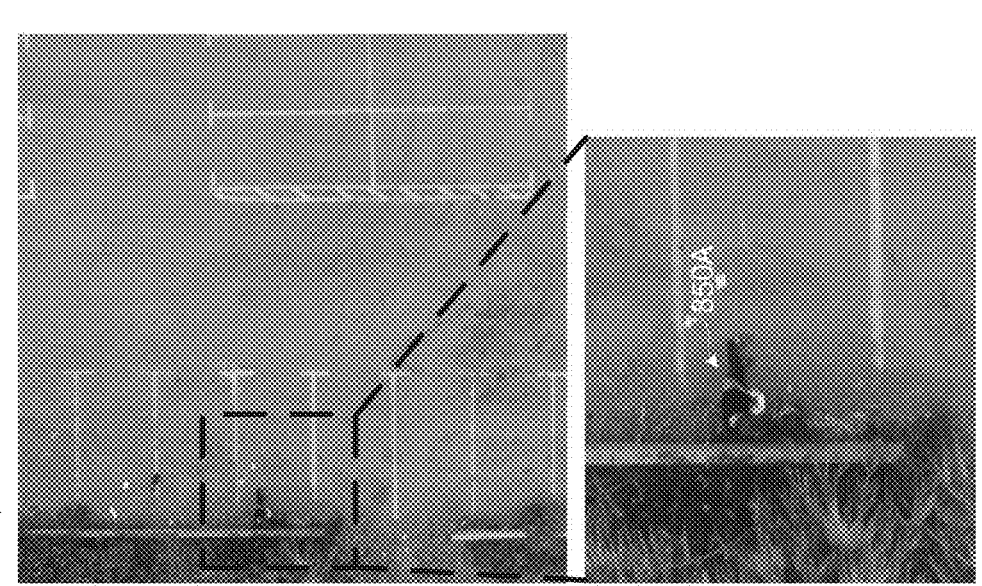

As seen in FIG. 8C, the change detector 220 may apply one or more trained ML models to analyze a current merged representation 840 of an exemplary site 202, for example, a parking lot compared to a previous merged representation 842 of the parking lot.

As seen, based on the analysis, the ML model(s) may detect a person 850 in both the current merged representation 840 and the previous merged representation 842 where in the current merged representation 840 the person may be detected in location A while in the previous merged representation 842 the person may be detected in location B.

As seen in 844, based on comparison between the current merged representation 840 and the previous merged representation 842, the ML model(s) may detect a 3D change in a top side and/or surface of the head 852 of the person 850, specifically a change from location B (852B) in the previous merged representation 842 to location A (852A) in the current merged representation 840.

Figure 8D:
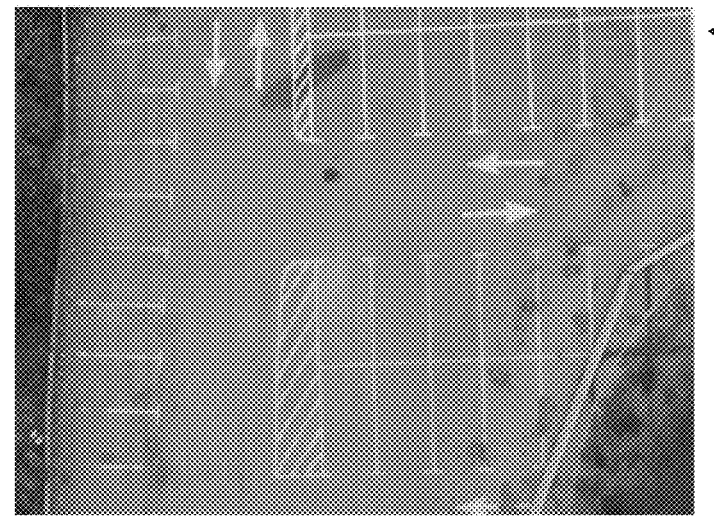
Figure 8D:
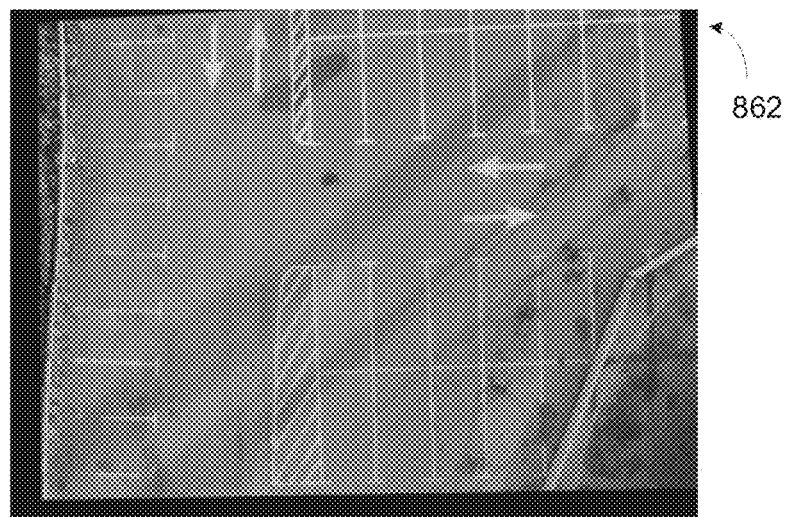
Figure 8D:
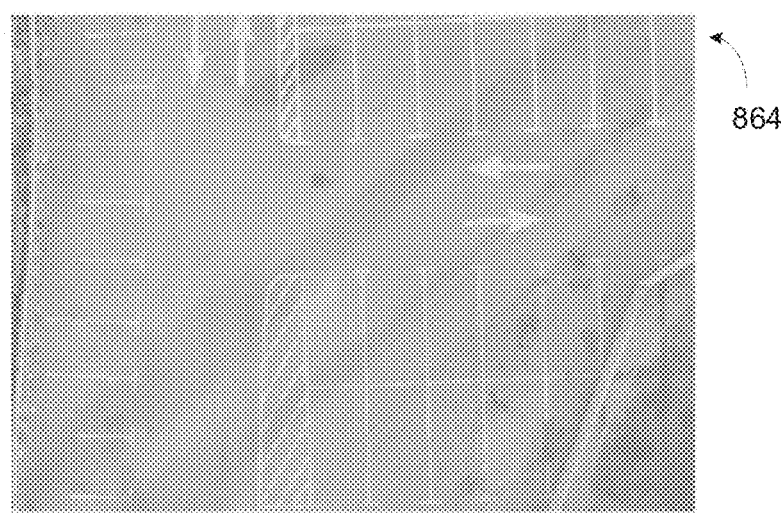

As seen in FIG. 8D, the change detector 220 may apply the trained ML model(s) to analyze a current merged representation 860 of an exemplary site 202, for example, a parking lot compared to a previous merged representation 862 of the parking lot. As seen, based on the analysis, the ML model(s) may detect no 3D changes in between the current merged representation 860 and the previous merged representation 862. Moreover, despite 2D changes which are evident between the current merged representation 860 and the previous merged representation 862, for example, 2D changes caused by different shadow patterns, due to the fact that the merged representations 860 and 862 merge images captured from a plurality of viewpoints, the ML model(s) may not interpret the 2D changes as 3D changes.

Optionally, in case one or more of the merged representations, for example, the current merged representation and/or the corresponding previous merged representation may be created using full and/or partial 3D reconstruction as described herein before, the change detector 220 may compensate for reconstruction errors of the 3D reconstruction.

Such reconstruction errors may be falsely interpreted as 3D changes in one or more of the merged representations. The change detector 220 may therefore apply one or more reconstruction error detection algorithms to determine whether one or more 3D changes detected in the current merged representation and/or of the corresponding previous merged representation are induced by reconstructions errors.

The reconstruction error detection algorithm(s) may be adapted, configured and/or trained to identify reconstruction errors typical to 3D reconstruction of sites 202, optionally reconstruction errors typical to 3D reconstruction of specific sites such as the sites 202. In another example, one or more of the ML model(s) used by the change detector 220 to detect 3D changes may be further adapted, trained, and/or learned to identify reconstruction errors and discern them from real 3D changes detected between the rent merged representation and/or the corresponding previous merged representation.

Optionally, the change detector 220 may instruct one or more of the dynamic vehicles 204 to conduct one or more additional scans of at least part of the site 202 responsive to detecting one or more suspected 3D changes.

Assuming that, based on analysis and comparison of one or more merged representations created using images of the site 202 captured during a current scan of the site 202 and one or more merged representations created using images of the site 202 captured during one or more previous scans of the site 202, the change detector 220 identifies a change suspected as a 3D change. Further assuming that change detector 220 is unable to conclusively determine whether the change is indeed a 3D change, for example, the depth difference indicated by the 3D change is marginal with respect to the certain threshold, the viewpoints from which the images are captured do not allow for clear distinction of one or more 3D features to which the 3D change relates, and/or the like.

In such case, the change detector 220 may instruct the dynamic vehicle(s) 204 to conduct one or more additional scans of the site 202 and/or part thereof during which a plurality of additional images of the site 202 may be captured from a plurality of different viewpoints. Moreover, the change detector 220 may optionally instruct and/or define one or more image capturing parameters for the vehicle(s) 204, for example, one or more viewpoints to capture the additional images, a route to follow for scanning the site 202, and/or the like.

The change detector 220 may create one or more additional merged representations using the images captured in the additional scan(s) and may compare between the additional merged representation(s) and one or more of the corresponding previous merged representation(s), specifically after registered to each other.

Launching one or more additional scans and identifying and/or estimating 3D changes based on differences between additional merged representation created based in imagery data captured during the additional scan(s) may significantly increase 3D change detection performance, for example, accuracy, reliability, integrity, robustness, and/or the like.

According to some embodiments of the present invention, the change detector 220 may first detect one or more 2D changes in the site 202 and/or part thereof which may be indicative of one or more 3D changes.

To this end, rather than creating merged representations in which 3D features may become apparent, the change detector 220 may first compare between one or more of the plurality of (current) images depicting at least part of the site which are captured during a current scan of the site 202 and one or more corresponding previous images of the site 202 captured during one or more of the previous scans of the site 202.

Typically, the change detector 220 may first register the current image(s) and the previous image(s) with each other before analyzing and comparing the images.

Based on the analysis and comparison of the current image(s) and the previous image(s), the change detector 220 may detect one or more 2D changes in one or more regions and/or sections of the site 202.

For example, the change detector 220 may apply one or more image processing algorithms to detect 2D changes between the current image(s) and corresponding previous image(s). Furthermore, the change detector 220 may focus and/or attempt to identify 2D changes which typically result from respective 3D changes.

In another example, the change detector 220 may use one or more ML models trained to identify 2D changes between images of common regions, areas, and/or sections. Moreover, one or more of the ML models may be specifically trained to detect 2D changes estimated with high probability to be indicative of respective 3D changes. For example, the ML model(s) may be trained with labeled training samples associating images in which 2D changes are detected with labels indicating that these 2D changes are induced with high probability by respective 3D changes.

The change detector 220 may create one or more merged representations for only part of the site 202, specifically merged representations of one or more of the regions, sections, and/or areas of the site 202 in which the 2D change(s) is detected. In such case, rather than creating a merged representation, current and/or previous, for the entire site 202 and/or for a substantial part of it, the change detector 220 may create a significantly smaller merged representations only for the regions, sections, and/or areas of the site 202 in which the 2D change(s) is detected. The change detector The change detector 220 may then compare between the current merged representation(s) and the corresponding previous merged representation(s) of the reduced size section of the site 202 in which the 2D change is detected and may determine whether the each detected 2D change is a 3D change in one or more 3D features in the site 202 or not. In particular, the change detector 220 may determine the 2D change is a 3D change in case the depth change to one or more of the 3D features indicated by the 3D change exceeds the certain threshold.

Identifying 2D changes may be a significantly simpler task compared to 3D change detection. Moreover, 2D changes may be detected based on analysis of the readily available images of the site 202 without the need to create merged representations of the site 202 and/or part thereof. As such, computing resources (e.g., processing power, compute time, storage resources, etc.) may be significantly reduced due to the need to create merged representations for significantly smaller sections of the site 202.

Figure 9:
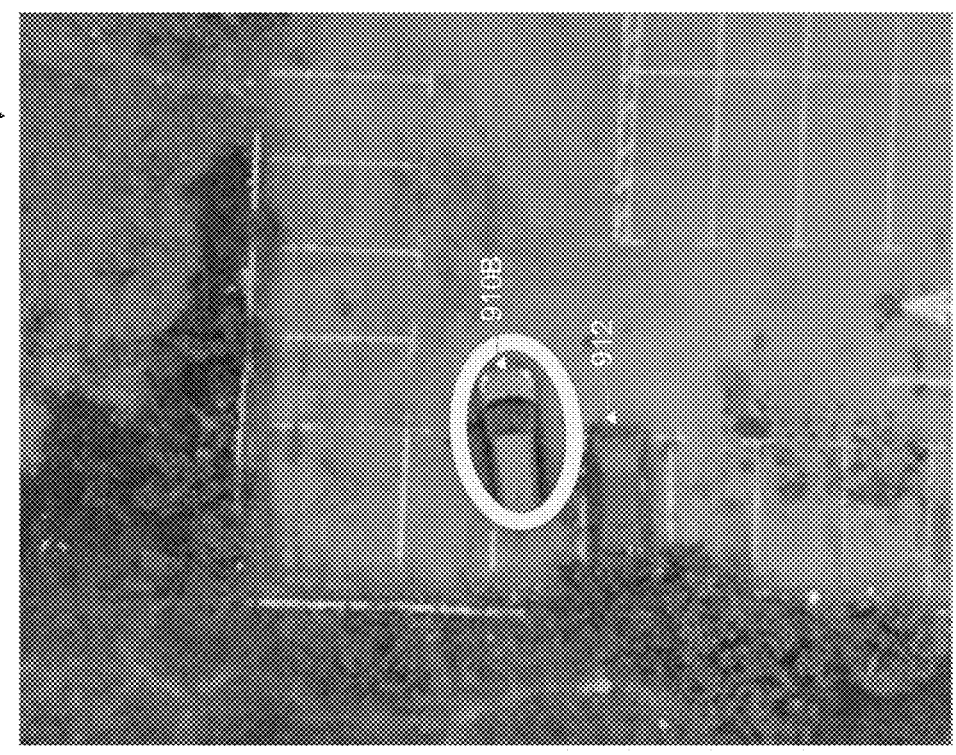
FIG. 9 presents images of an exemplary site analyzed to detect 2D changes as a first step for detecting 3D changes in the site, according to some embodiments of the present invention.
Figure 9:
Figure 9:
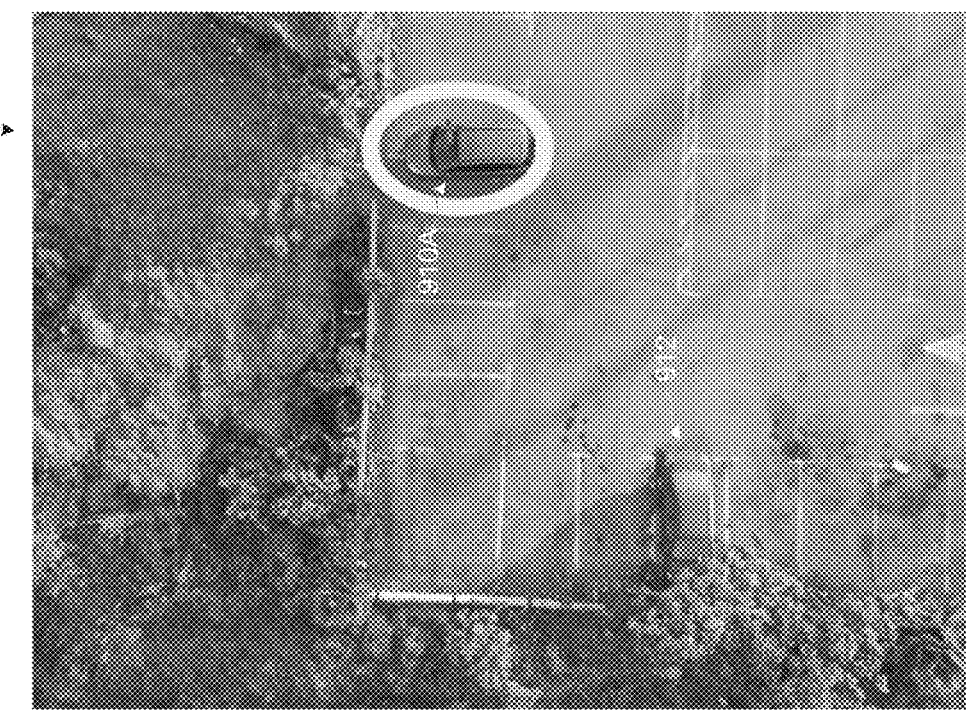

Reference is now made to FIG. 9, which presents images of an exemplary site analyzed to detect 2D changes as a first step for detecting 3D changes in the site, according to some embodiments of the present invention.

A current image 900 may be captured during a current scan of an exemplary site such as the site 202, for example, a parking lot while a previous image 902 captured during a previous scan of the parking lot.

After registering the current image 900 and the previous image 902 with each other, a change detector such as the change detector 220 may analyze the current image 900 compared to the previous image 902 in attempt to detect one or more 2D changes which may be indicative of one or more 3D changes.

As seen, based on the analysis, the change detector 220 may detect a first vehicle 910 and a second vehicle 912 in both the current image 900 and the previous image 902. The change detector 220 may further detect that the first vehicle 910 is located at location A (910A) in the current image 900 and at location B (810B) in the previous image 902.

Based on comparison between the current image 900 and the previous image 902, the change detector 220 may detect that the first vehicle 910 changed its location from location B (910B) to location A (910A). The change detector 220 may further detect that the second vehicle 912 did not change its location between the previous image 902 and the current image 900.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms drone, UAV, 3D reconstruction, and ML models are intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of detecting three dimensional (3D) changes in sites, comprising:

using at least one processor for:

receiving a plurality of images of a site captured from a plurality of viewpoints by at least one image sensor mounted on at least one dynamic vehicle scanning the site;

registering at least some of the plurality of images to each other;

creating at least one merged representation of at least part of the site based on the at least some registered images depicting the at least part of the site from at least some of the plurality of viewpoints;

comparing between the at least one merged representation and at least one corresponding previous merged representation created based on a plurality of previous images captured during at least one previous scan of the site;

detecting, based on the comparison, at least one 3D change indicative of a depth change exceeding a certain threshold in at least one 3D feature at the site; and generating a change indication indicative of the at least one detected 3D change;

wherein the at least one corresponding previous merged representation is selected according to geolocation metadata associated with each of a plurality of previous merged representations of the site, the geolocation metadata is indicative of the geolocation of the at least part of the site depicted in the plurality of previous images used to create the respective previous merged representation.

2. The method of claim 1, wherein the at least some images are registered each other according to at least one common visual feature detected in the at least some images.

3. The method of claim 1, wherein the at least one merged representation is created based on pixel subtraction of corresponding pixels in the at least some registered images.

4. The method of claim 1, wherein the at least one merged representation is created based on at least partial 3D reconstruction of the at least part of the site using the at least some registered images.

5. The method of claim 1, wherein the at least one merged representation comprises a point cloud model of the at least part of the site.

6. The method of claim 1, wherein the at least one merged representation comprises a textured 3D model of the at least part of the site.

7. The method of claim 1, wherein the at least one merged representation comprises an ortophoto of the at least part of the site.

8. The method of claim 1, wherein the at least one merged representation comprises at least one panoramic image of the at least part of the site created by stitching at least some of the plurality of images.

9. The method of claim 1, wherein the at least one 3D change is detected using at least one trained machine learning model.

10. The method of claim 1, wherein the at least one 3D change is detected using at least one image processing algorithm.

11. A method of detecting three dimensional (3D) changes in sites, comprising:

using at least one processor for:

receiving a plurality of images of a site captured from a plurality of viewpoints by at least one image sensor mounted on at least one dynamic vehicle scanning the site;

registering at least some of the plurality of images to each other;

creating at least one merged representation of at least part of the site based on the at least some registered images depicting the at least part of the site from at least some of the plurality of viewpoints;

comparing between the at least one merged representation and at least one corresponding previous merged representation created based on a plurality of previous images captured during at least one previous scan of the site;

detecting, based on the comparison, at least one 3D change indicative of a depth change exceeding a certain threshold in at least one 3D feature at the site; and generating a change indication indicative of the at least one detected 3D change;

wherein the at least one merged representation is registered to the corresponding previous merged representation according to at least one common visual feature detected in the at least one merged representation and in the corresponding previous merged representation.

12. A method of detecting three dimensional (3D) changes in sites, comprising:

using at least one processor for:

receiving a plurality of images of a site captured from a plurality of viewpoints by at least one image sensor mounted on at least one dynamic vehicle scanning the site;

registering at least some of the plurality of images to each other;

creating at least one merged representation of at least part of the site based on the at least some registered images depicting the at least part of the site from at least some of the plurality of viewpoints;

comparing between the at least one merged representation and at least one corresponding previous merged representation created based on a plurality of previous images captured during at least one previous scan of the site;

detecting, based on the comparison, at least one 3D change indicative of a depth change exceeding a certain threshold in at least one 3D feature at the site; and generating a change indication indicative of the at least one detected 3D change;

applying at least one reconstruction error detection algorithm to determine whether the at least one detected 3D change is induced by at least one reconstruction error in the at least one merged representation and/or in the at least one corresponding previous merged representation.

13. A method of detecting three dimensional (3D) changes in sites, comprising:

using at least one processor for:

receiving a plurality of images of a site captured from a plurality of viewpoints by at least one image sensor mounted on at least one dynamic vehicle scanning the site;

registering at least some of the plurality of images to each other;

creating at least one merged representation of at least part of the site based on the at least some registered images depicting the at least part of the site from at least some of the plurality of viewpoints;

comparing between the at least one merged representation and at least one corresponding previous merged representation created based on a plurality of previous images captured during at least one previous scan of the site;

detecting, based on the comparison, at least one 3D change indicative of a depth change exceeding a certain threshold in at least one 3D feature at the site; and generating a change indication indicative of the at least one detected 3D change;

first detecting at least one 2D change indicative of at least one potential 3D change in the at least part of the site by:

comparing between at least one of the plurality of images depicting the at least part of the site and at least one corresponding previous image of the plurality of previous images, detecting at least one 2D change based on the comparison, comparing between at least section of the at least one merged representation and the at least one corresponding previous merged representation in which the at least one 2D change is detected, and determining whether the at least one 2D change is a 3D change indicative of a depth change exceeding a certain threshold in at least one 3D feature at the site.

14. The method of claim 13, wherein a path followed of the at least one dynamic vehicle to scan the site is similar to a path followed during the at least one previous scan.

15. The method of claim 13, wherein the at least one dynamic vehicle is an aerial vehicle which is a member of a group consisting of: a drone, an unmanned aerial vehicle (UAV), and a satellite.

16. A method of detecting three dimensional (3D) changes in sites, comprising:

using at least one processor for:

receiving a plurality of images of a site captured from a plurality of viewpoints by at least one image sensor mounted on at least one dynamic vehicle scanning the site;

registering at least some of the plurality of images to each other;

creating at least one merged representation of at least part of the site based on the at least some registered images depicting the at least part of the site from at least some of the plurality of viewpoints;

comparing between the at least one merged representation and at least one corresponding previous merged representation created based on a plurality of previous images captured during at least one previous scan of the site;

detecting, based on the comparison, at least one 3D change indicative of a depth change exceeding a certain threshold in at least one 3D feature at the site; and generating a change indication indicative of the at least one detected 3D change;

instructing the at least one dynamic vehicle to conduct at least one additional scan of at least part of the site responsive to detecting at least one suspected 3D change, and comparing between at least one additional merged representation created based on at least some registered images of a plurality of images captured from a plurality of viewpoints during the at least one additional scan and the at least one corresponding previous merged representation.

17. A system for detecting three dimensional (3D) changes in sites, comprising:

at least one processor configured to execute a code, the code comprising:

code instructors to receive a plurality of images of a site captured from a plurality of viewpoints by at least one image sensor mounted on at least one dynamic vehicle scanning the site;

code instructors to register at least some of the plurality of images to each other;

code instructors to create at least one merged representation of at least part of the site based on the registered at least some images depicting the at least part of the site from at least some of the plurality of viewpoints;

code instructors to compare between the at least one merged representation and at least one corresponding previous merged representation created based on a plurality of previous images captured during at least one previous scan of the site;

code instructors to detect, based on the comparison, at least one 3D change indicative of a depth change exceeding a certain threshold in at least one 3D feature at the site; and code instructors to generate a change indication indicative of the at least one detected 3D change;

wherein the at least one corresponding previous merged representation is selected according to geolocation metadata associated with each of a plurality of previous merged representations of the site, the geolocation metadata is indicative of the geolocation of the at least part of the site depicted in the plurality of previous images used to create the respective previous merged representation.

* * * * *